United States Patent
Rafferty et al.

(10) Patent No.: US 10,645,075 B1
(45) Date of Patent: May 5, 2020

(54) AUTOMATED SYSTEM TO PERFORM PENETRATION TESTING ON DOMAINS OF RELATED INTERNET-ENABLED SERVICES

(71) Applicant: Capital One Services, LLC, McLean, VA (US)

(72) Inventors: Galen Rafferty, Mahomet, IL (US); Austin Grant Walters, Savoy, IL (US); Anh Truong, Champaign, IL (US); Reza Farivar, Champaign, IL (US); Jeremy Edward Goodsitt, Champaign, IL (US); Vincent Pham, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/423,549

(22) Filed: May 28, 2019

(51) Int. Cl.
*H04L 29/06* (2006.01)
*G06Q 20/10* (2012.01)
*H04W 12/06* (2009.01)
*H04L 9/32* (2006.01)

(52) U.S. Cl.
CPC ......... *H04L 63/083* (2013.01); *G06Q 20/108* (2013.01); *H04L 63/205* (2013.01); *H04W 12/0608* (2019.01); *H04L 9/3226* (2013.01)

(58) Field of Classification Search
CPC . H04L 63/08–10; H04L 63/20; H04L 63/205; H04L 9/3226–3234; H04W 12/0608; G06Q 20/108; G06F 21/31; G06F 21/41–45; G06F 21/6218
See application file for complete search history.

(56) References Cited

U.S. PATENT DOCUMENTS

| | | | |
|---|---|---|---|
| 10,042,999 B2* | 8/2018 | Li | H04L 63/083 |
| 2013/0014236 A1* | 1/2013 | Bingell | H04L 63/0846 726/6 |
| 2014/0282978 A1* | 9/2014 | Lerner | H04L 63/083 726/7 |
| 2015/0254452 A1 | 9/2015 | Kohlenberg et al. | |
| 2017/0331824 A1* | 11/2017 | Pender | H04L 63/0892 |
| 2017/0357976 A1* | 12/2017 | Malik | G06Q 20/4014 |

OTHER PUBLICATIONS

Jenkins, J.L., et al., "Improving Password Cybersecurity Through Inexpensive and Minimally Invasive Means: Detecting and Deterring Password Reuse Through Keystroke-Dynamics Monitoring and Just-in-Time Fear Appeals", Information Technology for Development, 20(2):196-213.

(Continued)

*Primary Examiner* — Meng Li
*Assistant Examiner* — Shaqueal D Wade

(57) ABSTRACT

A system and method are disclosed in which a new or updated password is tested on other websites before being accepted as a password for a website of a bank. The tested websites may include those of competitor banks or other financial institutions, popular websites, and/or websites frequently used by the customer. If a login at one of the other websites using the new or updated password is successful, the password is not accepted at the bank and the user is asked to create a different password. The new or updated password is discarded after the test of other websites are made and is not saved by the bank.

16 Claims, 7 Drawing Sheets

(56) References Cited

OTHER PUBLICATIONS

Das, A., et al, "The Tangled Web of Password Reuse", NDSS Symposium 2014 [online] [retrieved on May 27, 2019]. Retrieved from Internet URL: https://www.ndss-symposium.org/wp-content/uploads/2017/09/06_1_1.pdf, 15 pages.

Golla, M., et al., "What was that site doing with my Facebook Password?" Designing Password-Reuse Notifications CCS'18, Oct. 15-19, 2018, Toronto, ON, Canada, 18 pages.

* cited by examiner

100

300

400

600

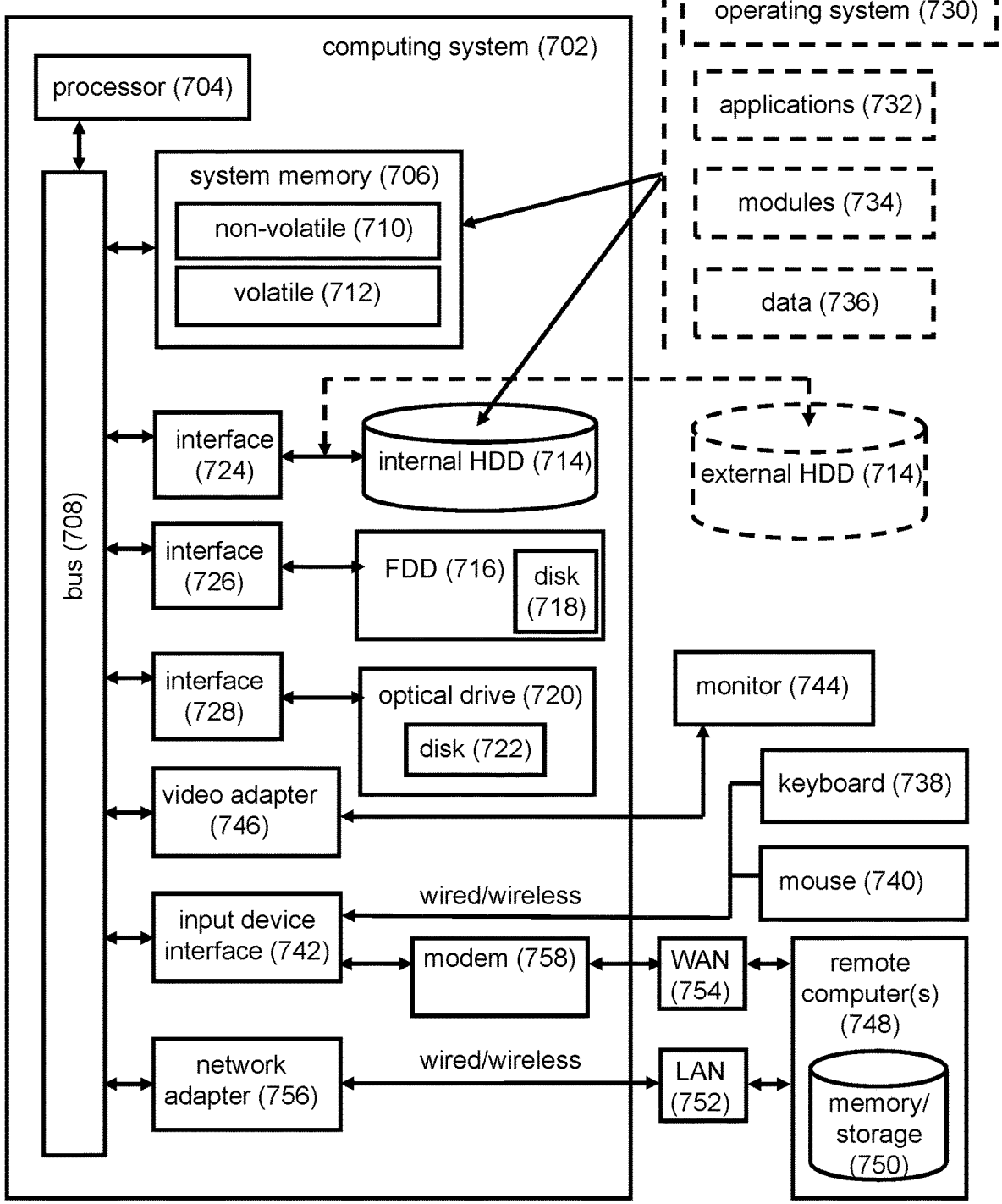

US 10,645,075 B1

AUTOMATED SYSTEM TO PERFORM PENETRATION TESTING ON DOMAINS OF RELATED INTERNET-ENABLED SERVICES

BACKGROUND

Penetration testing, also known as pen testing or ethical hacking, is the practice of testing a computer system, network, or web application to find security vulnerabilities that an attacker could exploit.

One of the vulnerabilities of a computer system is poor password practice. Many hacking-related breaches occur because of either stolen or weak passwords. And, password reuse is a practice that is unfortunately fairly common, even for users logging into sensitive websites, such as those of their bank or other financial institution.

BRIEF DESCRIPTION OF THE DRAWINGS

FIG. 7 is a diagram of an exemplary computing architecture in which the system for password non-reuse verification of FIG. 1 may operate, according to some embodiments.

The same numbers are used throughout the disclosure and the figures to reference like components and features. Numbers in the 100 series refer to features originally found in FIG. 1, numbers in the 200 series refer to features originally found in FIG. 2, and so on.

DETAILED DESCRIPTION

Figure 1:
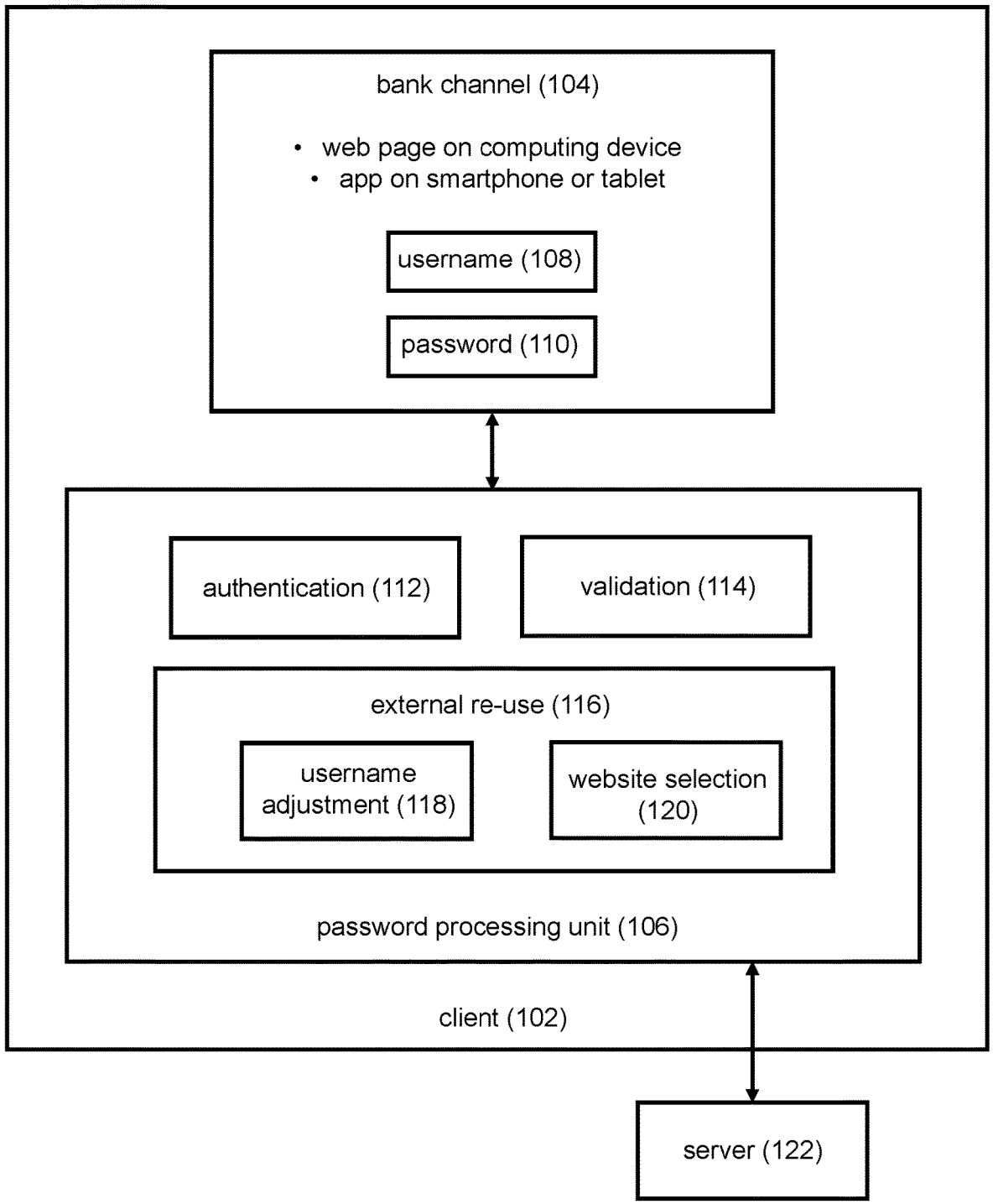
FIG. 1 is a diagram of a system for password non-reuse verification, according to some embodiments.

In accordance with the embodiments described herein, a system and method are disclosed in which a new or updated password is tested on other websites before being accepted as a password for a website of a bank. The tested websites may include those of competitor banks or other financial institutions, popular websites, and/or websites frequently used by the customer. If a login at one of the other websites using the new or updated password is successful, the password is not accepted at the bank and the user is asked to create a different password. The new or updated password is discarded after the test of other websites are made and is not saved by the bank.

Evolution of the Banking Relationship

Banks and other financial institutions provide a number of different services involving finances, most notably, a checking or savings account. Hereinafter, a reference to a "bank" is meant to encompass other financial institutions, including, but not limited to credit unions, savings and loan institutions, and financial service providers, such as credit card companies, brokers, mortgagors, investment funds, and so forth. Initially, a customer of a bank would rely on a passbook, a booklet issued by the bank, enabling the accountholder to personally record how much money had been deposited or withdrawn from the account. More recently, an accountholder would receive a statement, usually monthly, in the mail.

With the advent of personal computers, banks began providing account statements by electronic mail for those users who selected the feature, such as being part of the institution's "paperless" option. Today, many banks enable customers to access their account information by way of a personal computer, laptop, tablet, notebook, pad, personal digital assistant, or other device that has access to the Internet. From a web page in which a username and password are provided as authentication, the user is able to receive a wealth of information about the bank account, including recent purchases and deposits, transaction entities, bank statements, and so on. These web accesses also enable transactions to take place, known colloquially as "online banking" in which automatic payments may be scheduled and money may be transferred between different accounts of the user, to a third-party account within the same bank, and even to a third-party account with another bank. Relying on this Internet-based access, today's accountholder may view the current balance of an account twenty-four hours a day, seven days a week.

With the proliferation of hand-held device technology, such as smart phones, many banks have made applications (known colloquially as "apps") available to their customers. As long as the smartphone is able to access the Internet, the bank may provide a downloadable app for accessing a customer's bank account from the smartphone. Similar to the web page, the app, once selected, will generally request a username and password to authenticate the user. Alternatively, some apps enable access using a fingerprint or voiceprint to authenticate the user. Once authenticated, the user is able to review the account, such as to obtain balance information, scroll through transactions, make transfers to another account, deposit checks, and so on. These apps are intended to enhance the convenience for the accountholder. So, in addition to being able to access one's checking account by accessing a web page, a user may similarly access the account by enabling the app on a smartphone.

System and Method for Password Non-Reuse Verification

FIG. 1 is a simplified block diagram of a system for password non-reuse verification 100, according to some embodiments. The password non-reuse verification system 100 is designed to enable a bank to train its customers not to use passwords that the customers have already used on other websites.

The system for password non-reuse verification 100 uses information submitted by the user during account creation and/or password updates to automatically detect and prevent external password reuse. The system 100 features a client-side application system (e.g., on customer's computer) that asks the customer for the desired password. Before any data is submitted to the bank, the client-side system first checks for internal password validity (character length, special characters, etc.) and also checks for external re-use.

Using a system that clusters related services using keywords (such as banking, investment, etc.), the system 100 automatically attempts to gain access to any of these systems through their online applications, using the username and password submitted by the customer. If the login is successful, the system notifies the customer that their desired password is not valid. The username and password are registered to the bank after the password tests are complete and no reuse of the password is confirmed.

The system for password non-reuse verification 100 consists of a client 102 having a bank channel 104 and a client-side application system, shown in FIG. 1 as a password processing unit 106. The password processing unit 106, operating on the client 102, may communicate with a server 122, which is controlled by the bank. The server 122 is a computing system of the bank, which may be on the premises of the bank, may be a cloud server, or may be a combination of on-premises and cloud-based computing. In some embodiments, the username 108 and password 110 are saved at server 122 once the password processing unit 106 authenticates, validates, and confirms no external re-use of the password.

The bank channel 104 accessed by the client 102 may be a bank website on a customer's computing device, such as a desktop or laptop computer. Or, the bank channel 104 may be an app of the bank that may be activated on the customer's smartphone or tablet.

The password processing unit 106 includes authentication 112, validation 114, and external re-use 116 components. In some embodiments, the authentication component 112 consists of a mechanism to confirm that the customer is a customer known to the bank, and may operate in conjunction with the password processing unit 106, such as, in some circumstances, performing two-step authentication when the customer logs into a web page or smartphone app. The two-step authentication may be a code sent to the customer's email address, a code sent to the customer's smartphone via a short message service (SMS) text message, a voice mail indicating a code sent to the customer's landline or smart phone, or other means. Other authentication mechanisms may include requesting the customer's account number, verifying Internet Protocol (IP) address of a computing system used by the customer, and other means.

The validation component 114 of the password processing unit 106 confirms the validity of the username and password entered by the customer on the bank channel 104, whether the web page or the smartphone app, when logging into the banking website. In some embodiments, the validation component 114 also ensures that, upon entry of a new password, that is, one created by the customer when first attempting to enter the bank website, or entry of a changed password, the new or changed password conforms to the password criteria of the bank channel 104. The password criteria may include a minimum (and/or maximum) number of characters, an alphanumeric requirement (e.g., that the password contain both letters and numbers), a non-alphanumeric character requirement, such as $, #, or %, a requirement that one or more alphabetic characters be capitalized, and so on.

The validation component 114 provides a response to the customer upon receiving the username and password, that is, whether the username and password have been correctly entered. If the customer incorrectly enters either the username or the password, the validation component 114 prompts the customer to re-enter the username, the password, or both the username and password. In some embodiments, for security purposes, the validation component 114 may disable enabling the customer to enter the website after a predetermined number of failed attempts to correctly enter the username and password combination.

The external re-use component 116 performs the analysis to ensure that the customer of the bank is not using a password that the customer also uses on other websites. The username 108 and password 110 entered on the bank channel 104 by the customer, are tried on other websites. In some embodiments, the external re-use component 116 includes mechanisms to perform username adjustment 118 and website selection 120.

Password re-use at multiple sites is a significant security risk that may subject a bank to liability and theft and puts customers at increased risk from identity theft. By ensuring passwords used on the bank channel 104 are unique from all other related services a customer uses, the system for password non-reuse verification 100 provides an increased level of account, data, and financial security, in some embodiments.

Figure 2:
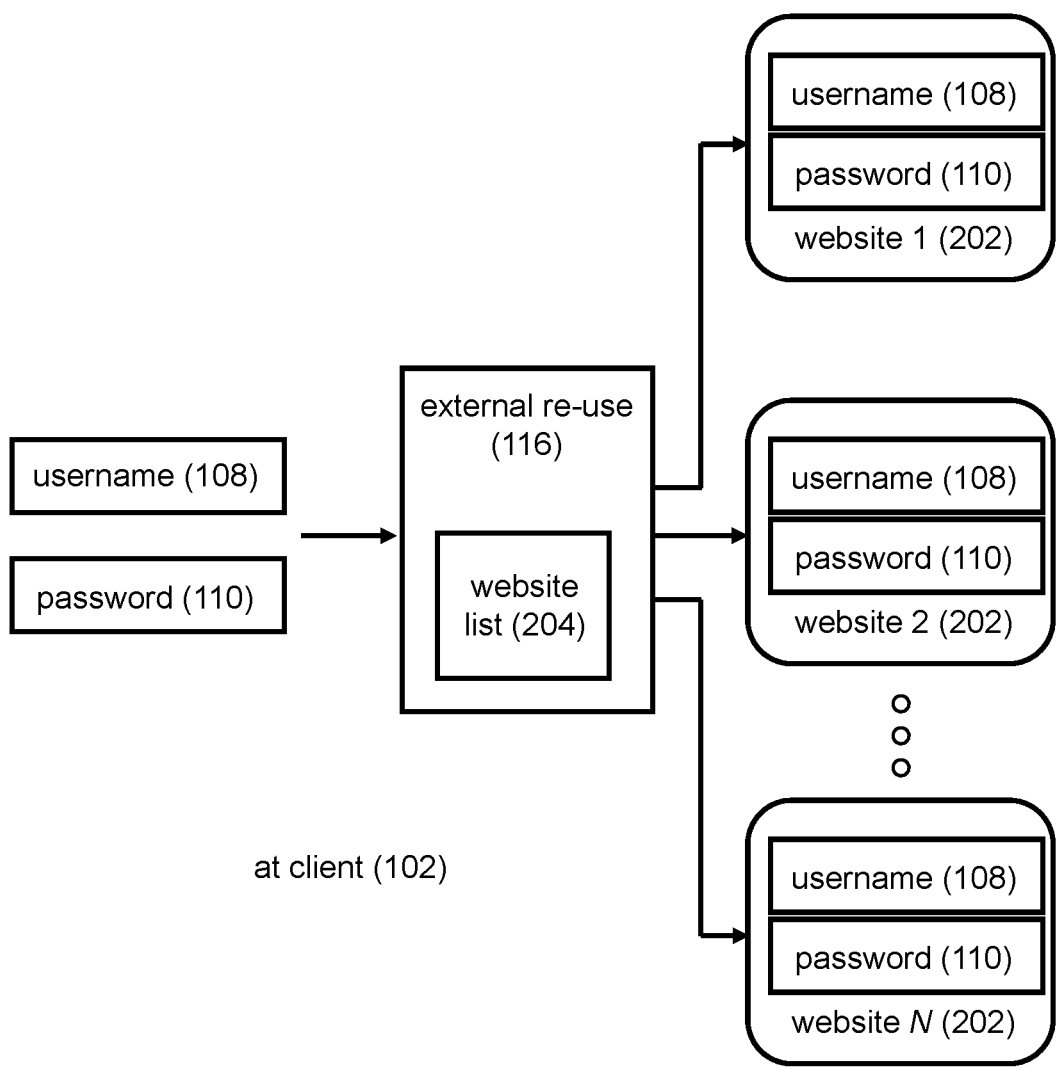
FIG. 2 is a diagram illustrating operations of the external re-use component of the system for password non-reuse verification of FIG. 1, according to some embodiments.

FIG. 2 is a simplified diagram illustrating the operations 200 of the external re-use component 116 of the password processing unit 106, according to some embodiments. The operations of FIG. 2 take place on the client 102. The external re-use component 116 receives the username 108 and password 110 from the bank channel 104, such as the web page 202 or app of the bank. In some embodiments, the external re-use component 116 includes a list of websites 204. The external re-use component 116 then, one by one, attempts to log onto multiple websites 206, in this case, N websites, for integer N, from the website list 204. The username/password pair are entered into a first website 206, a second website, and so on, until the process is performed on all N websites without success. If entering the username/password pair is successful on any one of the websites 206, the process is halted, in some embodiments, and the validation unit 114 of the password processing unit 106 (FIG. 1) will send a message to the customer, indicating that the password is not accepted. This thus prevents the password 110 from being used on the bank channel 104, since the customer has used the password elsewhere.

During the operations 200, the external re-use 116 may temporarily store the username 108 and password 110 in a memory storage at the client 102. In some embodiments, after the external re-use operations are complete, the memory location in which the username and/or password were stored is overwritten, so that the pair are not saved.

It is possible, however, that the customer is using the password 110 along with a different username, on the other websites. Some websites, for example, have rules regarding the selection of a username. Some websites use an electronic mail address as a username. Some websites automatically generate a username for the website user, such as one based on a first name, a last name, a date of birth, or combinations thereof. Accordingly, in some embodiments, the password processing unit 106 of FIG. 1 includes a username adjustment unit 118.

Figure 3:
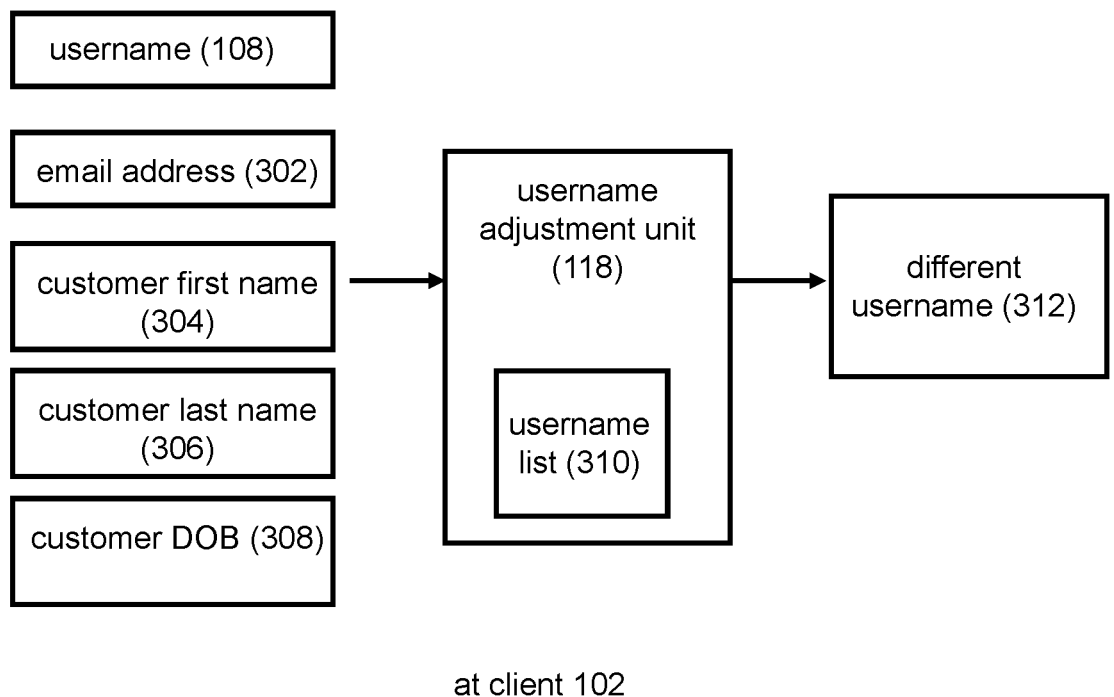
FIG. 3 is a diagram illustrating operations of the username adjustment unit of the system for password non-reuse verification of FIG. 1, according to some embodiments.

Operations 300 of the username adjustment unit 118 are illustrated in FIG. 3, according to some embodiments. The username adjustment unit 118 is used by the external re-use component 116 to determine whether the customer is using the password 110, but a username different from the username 108, to log into the other websites.

The username adjustment unit 118 may take as input one or more of the following, the username 108, an email address 302 of the customer, a customer first name 304, a customer last name 306, and a date of birth (DOB) 308 of the customer, to generate a different username 312. In one embodiment, the different username 312 is a modification of the username 126. In another embodiment, the different username 312 is the email address 302 of the customer. In some embodiments, the different username 312 is based on the customer first name 304, based on the customer last name 306, based on the customer DOB 308, or based on a combination of these inputs. The username adjustment unit 118 may keep a list 310 of different usernames to be used by the external re-use component 116.

Whether the username and password are based on the original username 108 and password 110 or based on the different username 312, the system for password non-reuse verification 100 attempts to log onto one or more websites with one or more combinations of username and password. In some embodiments, the websites are a predetermined selection of websites. In other embodiments, the predetermined selection belongs to competitors of the bank. In still other embodiments, the predetermined selection are popular websites. The system for password non-reuse verification 100 may include different sets of websites to test based on one or more of these criteria. Accordingly, in some embodiments, the password processing unit 106 of FIG. 1 includes a website selection unit 120.

Figure 4:
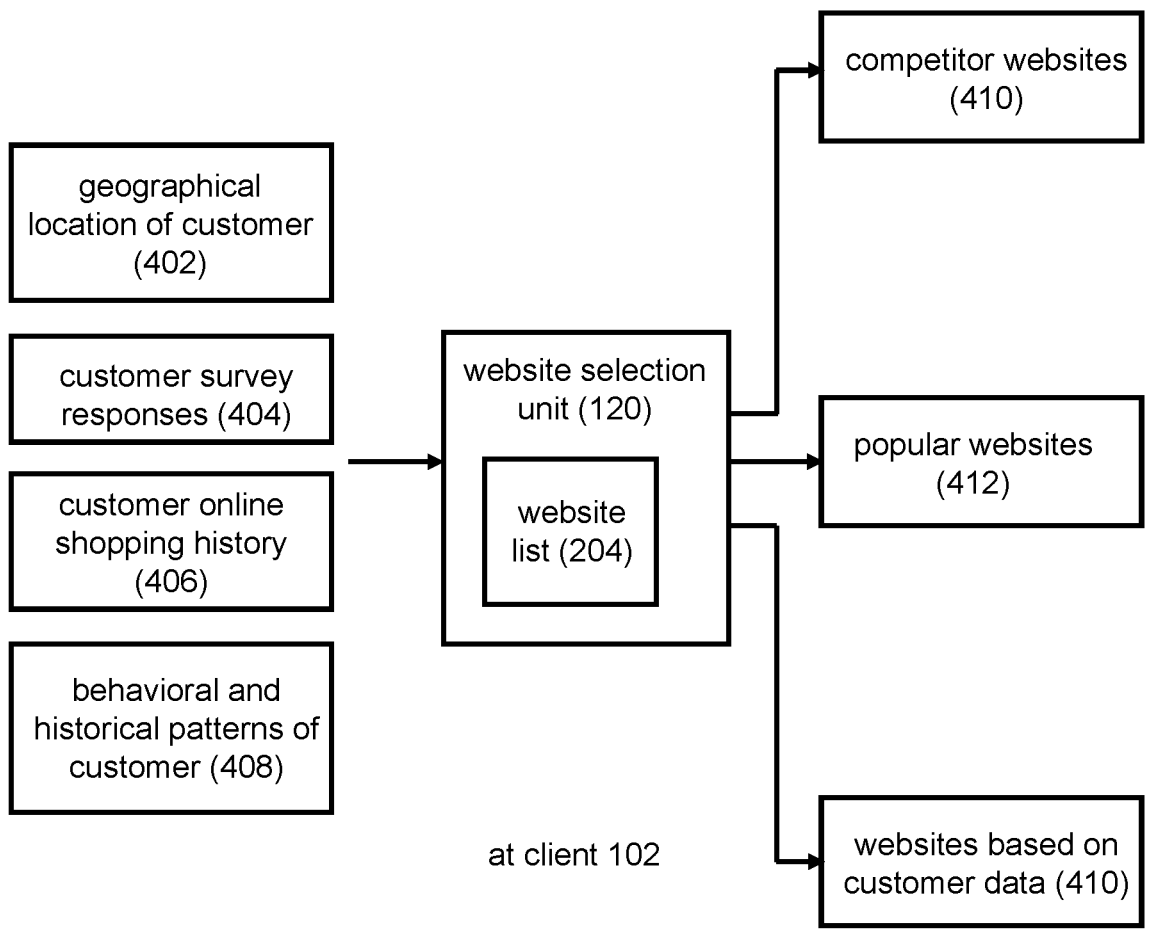
FIG. 4 is a diagram of the website selection unit used by the system for password non-reuse verification of FIG. 1, according to some embodiments.

FIG. 4 is a simplified block diagram 400 of the website selection unit 120 used by the system for password non-reuse verification 100, according to some embodiments. The website selection unit 120 may use the website list 204 (FIG. 2) to maintain a selection of competitor websites 410, such as those of other banks and other financial institutions. In some embodiments, the website selection unit 120 clusters related services using keywords (banking, investment, etc.), in generating the list of competitor websites 410.

The website list 204 may also maintain a selection of popular websites 412. In some embodiments, the popularity of a website may be based on publicly available information about the number of people who enter the website on a given day. The website selection unit 120 may limit the number of websites listed in the competitor websites 410 and in the popular websites 412, although their limits may be different.

Further, in some embodiments, the website selection unit 120 generates a list of websites based on customer data 410. Data such as one or more of the geographical location 402 of the customer, customer survey responses 404, customer online shopping history 406, and behavioral and historical patterns of the customer 408, may be used by the website selection unit 120 to maintain websites based on customer data 410. The geographical location 402 of the customer may indicate websites popular in that geographical region are likely candidates to be maintained.

The customer survey responses 404 may indicate websites of interest to the customer, resulting in another set of candidate websites to be maintained. Customer online shopping history 406 may provide information about websites commonly used by the customer and may supply yet another source of websites to be maintained.

The behavioral and historic patterns of the customer 408 may be additional customer data known to the bank, based on its ongoing relationship with the customer. Knowing that the customer uses an automatic teller machine (ATM) at a local mall may indicate that the customer shops at that mall, thus making websites associated with stores at the mall possible candidates for the websites based on customer data 410. One or more of these indicia 402, 404, 406, and 408 may enable the website selection unit 120 to select candidate websites that are likely to be ones used by the customer, and thus ones for which password non-reuse verification is advantageous.

In some embodiments, the system for password non-reuse verification 100 is designed to minimize losses by ensuring that the bank channels maintained by the bank are not compromised. The expense of customer service, public relations, or credit monitoring by the bank can thus be minimized. Thus, poor security practices or data breaches at other companies as a result of customers reusing-passwords across multiple services are less likely to impact the bank implementing the system for password non-reuse verification.

Other solutions may test password security using established, internally-held password information, which is a significant data security risk. By keeping the password processing unit 106 on the client side and registering password information at the server 122 only once the validity checks succeed, no customer or internal data is compromised, in some embodiments.

Figure 5:
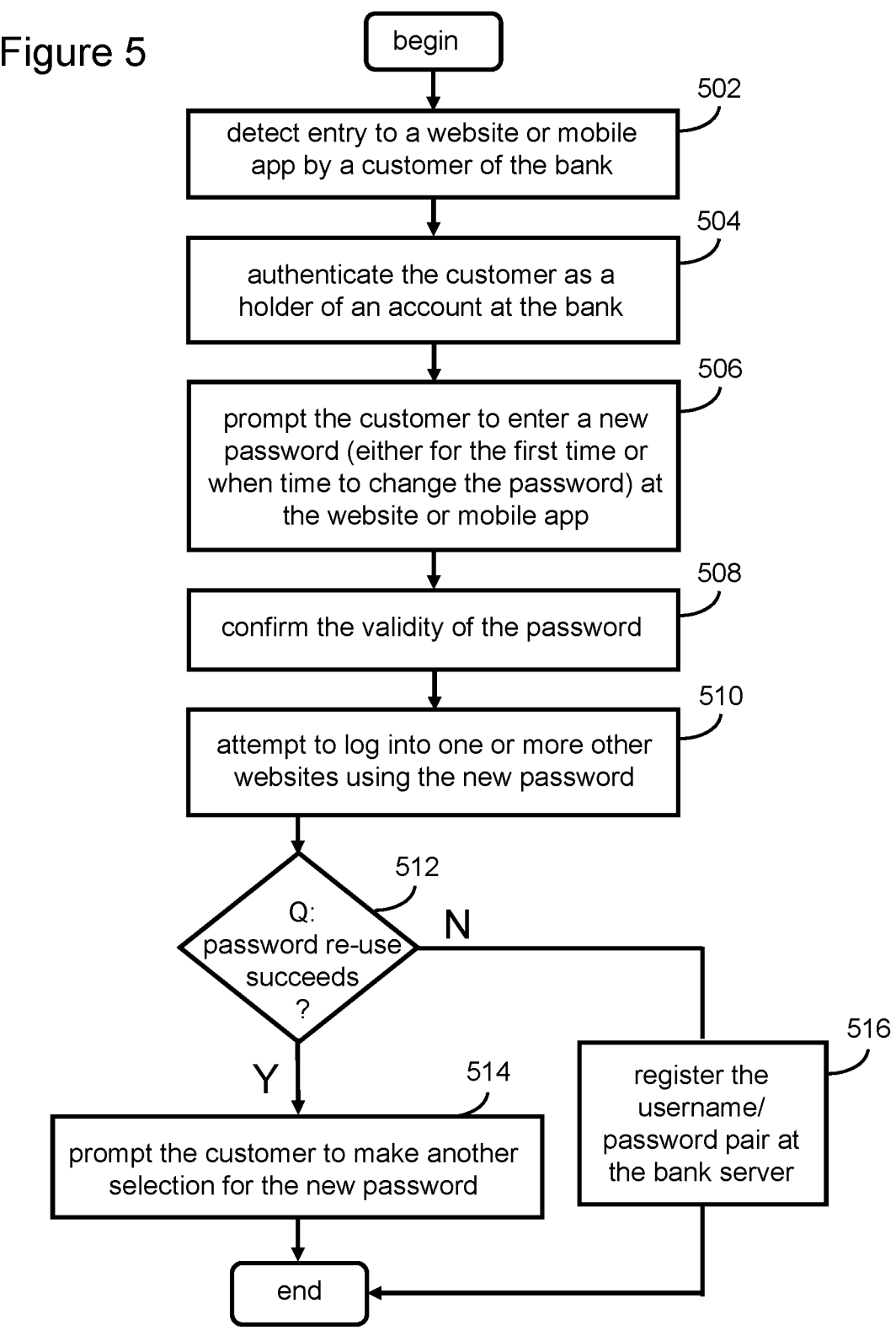
FIGS. 5 and 6 are flow diagrams illustrating method operations of the system for password non-reuse verification of FIG. 1, according to some embodiments.

FIG. 5 is a flow diagram illustrating method operations 500 of the system for password non-reuse verification of FIG. 1, according to some embodiments. In the illustrations of FIGS. 1-4, above, the operations take place at the client 102, and the method operations 500 are no different.

At the client 102, an entry to a website or mobile app by a customer of the bank is detected (block 502). For a regular customer of the bank, this detection would be done by receiving a correct username and password of the customer. Optionally, the customer may be authenticated as a holder of an account at the bank (block 504), as described above.

For new customers of the bank, this may be the first time the customer enters the website or mobile app. In this case, the customer is prompted to specify a username and new password for use at the website or mobile app (block 506). For customer that are not new to the website or mobile app, it may be time for the customer to change the password. The website may have limitations on how long a password may be used. The website may have a set time after which the password is to be changed, such as after 90 days, one after year, or after another time period. Thus, the customer may be prompted to enter a new password at the website or mobile app (block 506).

Before any data is sent to the server 122 (FIG. 1), the new password is checked for validity (block 508). Once confirmed as valid, one or more checks for re-use of the password are made, by attempting to log into other websites using the new password (block 510). If any of these re-use attempts is successful (block 512), the customer is then prompted to make a different selection for the new password (block 514). The password non-reuse verification system 100 notifies the customer that their desired password is not valid. For example, a screen maybe displayed at the web page or mobile app with, "you cannot use this password because it was already used at Chase Bank". Or the message can be more general, "the password does not satisfy our criteria, please make another selection".

Once the websites have been tested and the password has not resulted in successful login to any of those websites, the username and new password used by the customer in block 506 are registered at the bank server (block 516). The method operations 500 are thus complete.

Figure 6:
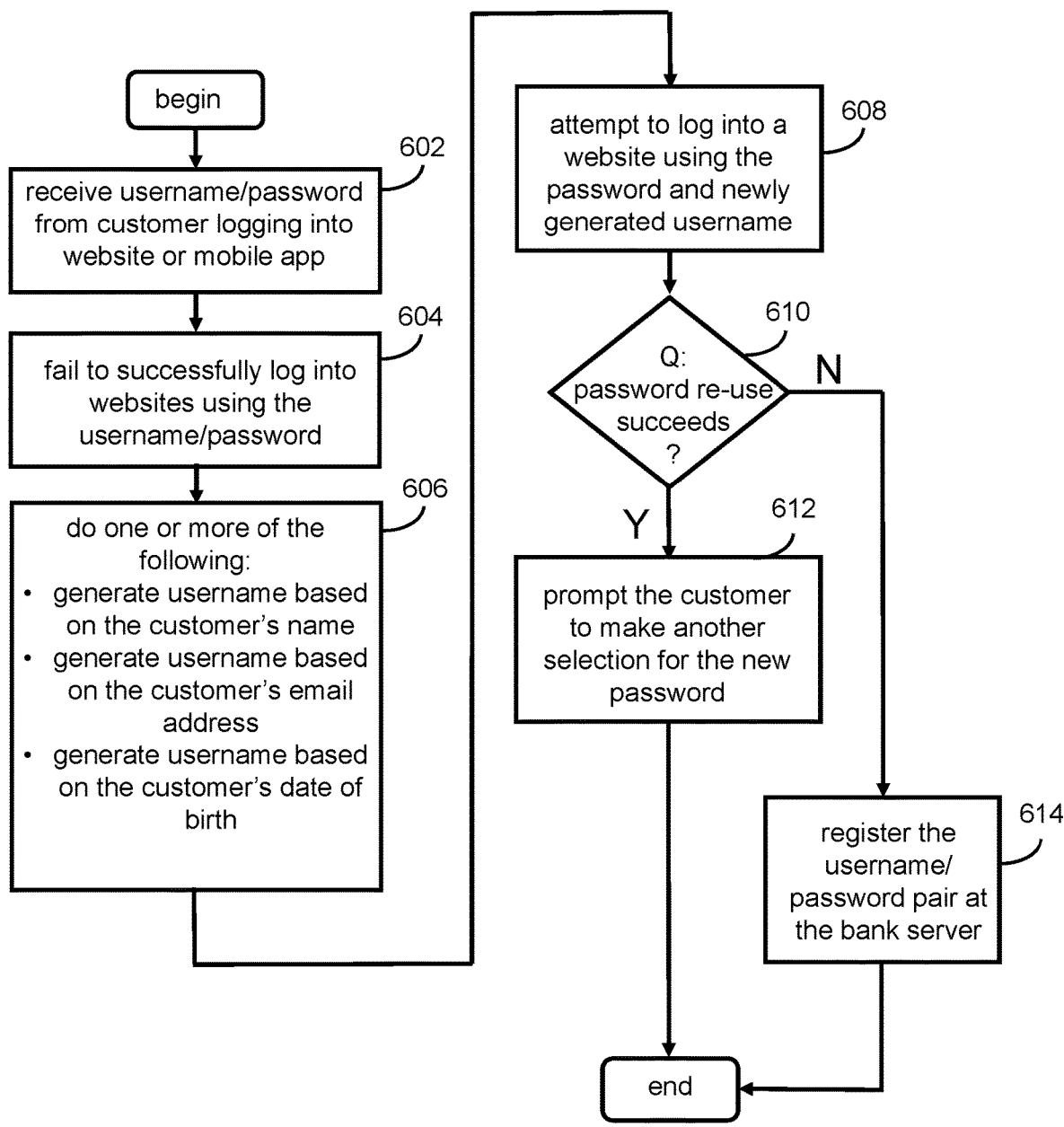

FIG. 6 is a flow diagram illustrating method operations 600 of the system for password non-reuse verification of FIG. 1, according to some embodiments. In the illustrations of FIGS. 1-5, above, the operations take place at the client 102, and the method operations 600 are no different. The method operations 600 involve either modifying the original username or creating a different username.

At the client 102, an entry to a website or mobile app by a customer of the bank is detected (block 602). As before, this may be a first-time customer of the website or app, thus entering a username and password for the first time, or the customer may have been prompted to update the password. The attempt to log into other websites using the username/password pair, such as are performed in FIG. 5, has not succeeded (block 604). Next, one or more of the following is done: the username is generated based on the customer's name, the username is generated based on the customer's email address, the username is generated based on the customer's DOB (block 606).

Once the new username is generated, attempts are made to log into one or more websites using the new username and new password (block 608). As before, if the password re-use succeeds (block 610), the customer is prompted to change the new password to a different one (block 612). Otherwise, the new password and the original username, that is, the username used to log into the bank's website, are registered at the bank server (block 612). The method operations 600 are thus complete.

FIG. 7 illustrates an embodiment of an exemplary computing architecture 700 comprising a computing system 702 that may be suitable for implementing various embodiments as previously described. In various embodiments, the computing architecture 700 may comprise or be implemented as part of an electronic device. In some embodiments, the computing architecture 700 may be representative, for example, of a system that implements one or more components of the password non-reuse verification system 100 and methods 500 and 600. In some embodiments, computing system 702 may be representative, for example, of the mobile devices used in implementing the password non-reuse verification system 100 and methods 500 and 600. The embodiments are not limited in this context. More generally, the computing architecture 700 is configured to implement all logic, applications, systems, methods, apparatuses, and functionality described herein.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 702 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 702.

As shown in FIG. 7, the computing system 702 comprises a processor 704, a system memory 706 and a system bus 708. The processor 704 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi-processor architectures may also be employed as the processor.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The memory 706 is not a propagating signal divorced from the underlying hardware of the computing system 702 and is thus non-transitory. The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computing system 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 1024 for external drive implementations can include at least one or both of Universal Serial Bus (USB) and IEEE 1394 interface technologies. The computing system 702 is generally is configured to implement all logic, systems, methods, apparatuses, and functionality described herein with reference to FIGS. 1-6.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the password non-reuse verification system 100 and methods 500 and 600.

A user can enter commands and information into the computing system 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computing system 702. In addition to the monitor 744, a computer typically includes other peripheral output devices, such as speakers, printers, and so forth.

The computing system 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computing system 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computing system 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computing system 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computing system 702, or portions thereof, can be stored in the remote memory/storage device 750. It will be appreciated that the network connections shown are exemplary and other means of establishing a communications link between the computers can be used.

The computing system 702 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operation in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. An apparatus, comprising:
a processor; and
memory coupled to the processor, the memory comprising instructions that, when executed by the processor, cause the processor to:
   detect entry to a website by a customer of a financial institution, the customer having a username, wherein the customer enters the username in an attempted login to the website;
   authenticate the customer, based on the username, as a holder of an account at the financial institution;
   prompt the customer to enter a password at the website, the website being affiliated with the financial institution, wherein the password is either a new password or a change from a previous password;
   in response to receiving the password from the customer at the website, attempt to log into one or more other websites maintained in a website list using the password;
   in response to successfully logging into one of the other website from the website list using the password, prompt the customer to enter a different password from the password in the attempted login to the website;
   in response to not successfully logging into any websites from the website list using the password, allow the customer to use the username and password to complete the attempted login at the website or mobile app; and
   overwrite a memory location in which the password was temporarily stored so the password is not saved.

2. The apparatus of claim 1, further comprising instructions that, when executed by the processor, cause the processor to:
   enter the username and the password at a plurality of the other websites from the website list, wherein a successful login to any of the plurality of the other websites will result in the password being rejected.

3. The apparatus of claim 1, further comprising instructions that, when executed by the processor, cause the processor to:
   periodically update the website list by adding or deleting websites from the website list.

4. The apparatus of claim 1, further comprising instructions that, when executed by the processor, cause the processor to:
   enter a new username and the password at the one or more other websites from the website list, wherein the new username is a variation of the username.

5. The apparatus of claim 1, further comprising instructions that, when executed by the processor, cause the processor to:
   enter a new username and the password at the one or more other websites from the website list, wherein the new username is based on a name of the customer.

6. The apparatus of claim 1, wherein the website list comprises websites of other financial institutions.

7. The apparatus of claim 1, wherein the website list comprises websites of non-financial institutions.

8. The apparatus of claim 1, further comprising instructions that, when executed by the processor, cause the processor to:
   obtain behavioral and historical patterns of the customer known to the financial institution, wherein the website list comprises websites associated with the behavioral and historical patterns.

9. At least one non-transitory machine-readable storage medium comprising instructions that, when executed by a processor, cause the processor to:
   receive a username and password at a login screen of a mobile app of a financial institution, the login screen being part of a website;
   obtain behavioral and historical patterns of a customer known to the financial institution, the customer being associated with the username and password;
   generate a variation of the username based on the behavioral and historical patterns;
   prompt for a new password to be entered;
   attempt to log into a plurality of other web sites maintained in a website list using:
      either the username or the a variation of the username; and the new password;
   either reject the new password in response to a successful login at one of the plurality of other websites or accept the new password and enable login at the mobile app of the financial institution in response to unsuccessful login attempts at the plurality of other web sites; and
   overwrite a memory location in which the new password was temporarily stored, wherein the new password is not saved.

10. The at least one non-transitory machine-readable storage medium of claim 9, comprising instructions that further cause the processor to:
    generate the variation of the username based on an email address used by the customer, the customer being associated with the username and password.

11. The at least one non-transitory machine-readable storage medium of claim 9, comprising instructions that further cause the processor to:
    choose a selected website of other financial institutions; and
    add the selected website to the website list.

12. The at least one non-transitory machine-readable storage medium of claim 9, comprising instructions that further cause the processor to:

choose a selected website based on popularity, wherein popularity of the selected website is based on a number of people who enter the selected website on a given day; and add the selected website to the website list.

13. The at least one non-transitory machine-readable storage medium of claim 9, comprising instructions that further cause the processor to:

generate the variation of the username based on a first and last name of the customer, the customer being associated with the username and password.

14. The at least one non-transitory machine-readable storage medium of claim 9, comprising instructions that further cause the processor to:

authenticate the customer as a holder of an account at the financial institution based on the username and password.

15. An apparatus, comprising:

a processor; and memory coupled to the processor, the memory comprising instructions that when executed by the processor cause the processor to:

detect a successful login by a customer at a website affiliated with a financial institution;

authenticate the customer as a holder of an account at the financial institution;

obtain behavioral and historical patterns of the customer known to the financial institution;

prompt the customer to enter a new password;

attempt to log into a different website using a username and the new password, wherein the username is based on behavioral and historical patterns of the customer;

either reject the new password in response to a second successful login at the different website or accept the new password in response to an unsuccessful login at a plurality of other websites; and write over a memory location in which the new password was temporarily stored.

16. The apparatus of claim 15, wherein the different website is affiliated with a bank or other financial institution that is unrelated to the financial institution.

* * * * *

UNITED STATES PATENT AND TRADEMARK OFFICE
CERTIFICATE OF CORRECTION

PATENT NO. : 10,645,075 B1
APPLICATION NO. : 16/423549
DATED : May 5, 2020
INVENTOR(S) : Galen Rafferty et al.

Page 1 of 1

It is certified that error appears in the above-identified patent and that said Letters Patent is hereby corrected as shown below:

In the Claims

Column 11, Claim 1, Lines 54-55; Please replace "login at the website or mobile app; and" with --login at the website--

Column 12, Claim 9, Line 42; Please replace "username or the a variation" with --username or the variation--

Signed and Sealed this
Twenty-first Day of July, 2020

Andrei Iancu
*Director of the United States Patent and Trademark Office*